(12) United States Patent
Nagai et al.

(10) Patent No.: US 9,997,743 B2
(45) Date of Patent: Jun. 12, 2018

(54) NONAQUEOUS ELECTROLYTE SECONDARY BATTERY

(75) Inventors: Hiroki Nagai, Nagoya (JP); Masahiro Morita, Nisshin (JP); Takashi Iwao, Kadoma (JP); Yukihiro Okada, Shijonawate (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 610 days.

(21) Appl. No.: 14/002,388

(22) PCT Filed: Mar. 3, 2011

(86) PCT No.: PCT/JP2011/054958
§ 371 (c)(1),
(2), (4) Date: Aug. 30, 2013

(87) PCT Pub. No.: WO2012/117557
PCT Pub. Date: Sep. 7, 2012

(65) Prior Publication Data
US 2013/0337305 A1    Dec. 19, 2013

(51) Int. Cl.
*H01M 2/02*    (2006.01)
*H01M 4/505*    (2010.01)
(Continued)

(52) U.S. Cl.
CPC .............. *H01M 2/02* (2013.01); *H01M 4/505* (2013.01); *H01M 4/525* (2013.01);
(Continued)

(58) Field of Classification Search
CPC ........... H01M 10/052; H01M 10/0566; H01M 10/0568; H01M 10/0569; H01M 10/0587;
(Continued)

(56) References Cited

U.S. PATENT DOCUMENTS 5,702,845 A   12/1997   Kawakami et al.
2005/0221182 A1*  10/2005  Fujiwara ................ H01M 4/13
429/231.1
(Continued)

FOREIGN PATENT DOCUMENTS

JP    2000-82496    3/2000
JP    2001-185223    7/2001
(Continued)

*Primary Examiner* — Lisa S Park
(74) *Attorney, Agent, or Firm* — Finnegan, Henderson, Farabow, Garrett & Dunner, LLP

(57) ABSTRACT

It is an object of the present invention to provide a nonaqueous electrolyte secondary battery with superior high-temperature charge-discharge cycle characteristics as well as superior low-temperature high-rate charge-discharge cycle characteristics. A nonaqueous electrolyte secondary battery 100 according to the present invention has an electrode body 80 which includes a positive electrode and a negative electrode, and a battery case 50 which houses the electrode body 80 together with a nonaqueous electrolyte, wherein among the nonaqueous electrolyte housed in the battery case 50, an electrolyte amount ratio (A/B) between a surplus electrolyte amount (A) that exists outside the electrode body 80 and an intra-electrode body electrolyte amount (B) impregnating the electrode body 80 ranges from 0.05 to 0.2, and DBP absorption of a positive electrode active material that constitutes the positive electrode is equal to or higher than 30 (ml/100 g).

11 Claims, 9 Drawing Sheets

(51) Int. Cl.
- *H01M 4/525* (2010.01)
- *H01M 10/052* (2010.01)
- *H01M 10/0566* (2010.01)
- *H01M 10/0587* (2010.01)
- *H01M 10/0568* (2010.01)
- *H01M 10/0569* (2010.01)

(52) U.S. Cl.
CPC ..... *H01M 10/052* (2013.01); *H01M 10/0566* (2013.01); *H01M 10/0587* (2013.01); *H01M 10/0568* (2013.01); *H01M 10/0569* (2013.01); *Y02T 10/7011* (2013.01)

(58) Field of Classification Search
CPC ........ H01M 2/02; H01M 4/505; H01M 4/525; Y02T 10/7011
See application file for complete search history.

(56) References Cited

U.S. PATENT DOCUMENTS

| | | | |
|---|---|---|---|
| 2006/0134521 A1* | 6/2006 | Shima | H01M 4/48 429/231.1 |
| 2007/0003835 A1* | 1/2007 | Hasegawa | H01M 4/382 429/231.95 |
| 2008/0138702 A1* | 6/2008 | Nakamura et al. | 429/163 |
| 2010/0068624 A1* | 3/2010 | Hiratsuka et al. | 429/223 |
| 2012/0282525 A1* | 11/2012 | Nagai et al. | 429/223 |

FOREIGN PATENT DOCUMENTS

| | | |
|---|---|---|
| JP | 2005-285606 | 10/2005 |
| JP | 2008-071731 | 3/2008 |
| JP | 2009-193805 | 8/2009 |
| JP | 2011-023221 | 2/2011 |
| WO | WO 2012/049778 A1 | 4/2012 |

* cited by examiner

NONAQUEOUS ELECTROLYTE SECONDARY BATTERY

CROSS-REFERENCE TO RELATED APPLICATIONS

This application is a national phase application of International Application No. PCT/JP2011/054958, filed Mar. 3, 2011, the content of which is incorporated herein by reference.

TECHNICAL FIELD

The present invention relates to a nonaqueous electrolyte secondary battery, and particularly to a nonaqueous electrolyte secondary battery having an electrode body which includes a positive electrode and a negative electrode and a battery case which houses the electrode body together with a nonaqueous electrolyte.

BACKGROUND ART

In recent years, lithium secondary batteries, nickel hydride batteries, and other secondary batteries are growing in importance as vehicle-mounted power supplies and as power supplies for personal computers and portable terminals. In particular, since lithium secondary batteries (typically, lithium-ion secondary batteries) are lightweight and produce high energy density, they are expected to be preferably used as high-output, vehicle-mounted power supplies. In a typical configuration of such a lithium secondary battery, charge and discharge are performed by the migration of lithium-ions between a positive electrode and a negative electrode. Patent Literature 1 discloses an example of prior art related to a lithium secondary battery.

CITATION LIST

Patent Literature

Patent Literature 1: Japanese Patent Application Publication No. 2005-285606

SUMMARY OF INVENTION

Meanwhile, with lithium secondary batteries, continuous and repetitive charge and discharge are known to result in so-called electrolyte depletion in which decomposition of a nonaqueous electrolyte inside an electrode body or migration of a nonaqueous electrolyte having penetrated into the electrode body to the outside of the electrode body causes a shortage in the electrolyte amount. When such electrolyte depletion occurs, the electrolyte amount falls below a required amount and overall charge-discharge characteristics of a battery declines. In addition, since battery reactions concentrate in portions where the electrolyte amount is relatively high, degradation of such portions is facilitated. All of these phenomena become factors for performance degradation (increased battery resistance, capacity degradation, and the like) and are therefore unfavorable. In particular, with lithium secondary batteries which require a long cycle life, it is essential to suppress performance degradation due to such electrolyte depletion.

For example, a conceivable method of preventing the electrolyte depletion described above involves housing, in advance, an excessive amount of an electrolyte in a battery during manufacture of the battery so that a shortage of the electrolyte does not occur. However, an evaluation performed by the present inventors revealed that with a lithium secondary battery in which an excessive amount of an electrolyte is housed in advance in a battery so that an electrolyte shortage does not occur, while capacity degradation due to high-temperature charge-discharge cycles is reduced, durability with respect to low-temperature high-rate charge-discharge cycles declines.

The present invention has been made in consideration of the above, and a main object of the present invention is to provide a nonaqueous electrolyte secondary battery with superior high-temperature charge-discharge cycle characteristics as well as superior low-temperature high-rate charge-discharge cycle characteristics.

The nonaqueous electrolyte secondary battery according to the present invention has an electrode body which includes a positive electrode and a negative electrode and a battery case which houses the electrode body together with a nonaqueous electrolyte. Among the nonaqueous electrolyte housed in the battery case, an electrolyte amount ratio (A/B) between a surplus electrolyte amount (A) that exists outside the electrode body and an intra-electrode body electrolyte amount (B) impregnating the electrode body ranges from 0.05 to 0.2 and DBP absorption of a positive electrode active material that constitutes the positive electrode is equal to or higher than 30 (ml/100 g).

According to the configuration described above, since the electrolyte amount ratio (A/B) between the surplus electrolyte amount (A) that exists outside the electrode body and the intra-electrode body electrolyte amount (B) impregnating the electrode body ranges from 0.05 to 0.2, a surplus electrolyte amount that exists in a free state outside the electrode body increases. Therefore, even if electrolyte depletion occurs in the electrode body due to repetitive charge and discharge, the intra-electrode, body electrolyte amount can be promptly restored by replenishing the electrolyte from the surplus electrolyte as appropriate. As a result, capacity degradation due to charge-discharge cycles particularly at high temperatures (for example, around 60° C.) can be reduced. In addition, since the DBP absorption of the positive electrode active material that constitutes the positive electrode is equal to or higher than 30 (ml/100 g), the nonaqueous electrolyte impregnating a positive electrode active material layer is readily absorbed by the positive electrode active material. Therefore, electrolyte depletion (ion shortage) is unlikely to occur in the positive electrode active material layer. As a result, although the configuration includes surplus electrolyte, performance degradation due to high-rate charge-discharge cycles particularly at low temperatures (for example, around −15° C.) can be suppressed. Consequently, according to the present invention, an optimal nonaqueous electrolyte secondary battery with superior high-temperature charge-discharge cycle characteristics as well as superior low-temperature high-rate charge-discharge cycle characteristics can be provided.

The electrolyte amount ratio (A/B) described above appropriately ranges from approximately 0.05 to 0.2 and favorably ranges from 0.068 to 0.19. When the electrolyte amount ratio (A/B) is too low, the intra-electrode body electrolyte amount cannot be promptly restored upon electrolyte depletion and performance degradation may occur during a high-temperature cycle. On the other hand, when the electrolyte amount ratio (A/B) is too high, low-temperature high-rate cycle characteristics may decline. From the perspective of achieving a balance between high-temperature cycle characteristics and low-temperature high-rate cycle characteristics, the electrolyte amount ratio (A/B)

described above ranges from appropriately 0.05 to 0.2, favorably ranges from 0.068 to 0.19, and particularly favorably ranges from 0.1 to 0.15.

In addition, the DBP absorption of the positive electrode active material described above appropriately ranges from 30 (ml/100 g) to 50 (ml/100 g), favorably ranges from 36 (ml/100 g) to 50 (ml/100 g), and particularly favorably ranges from 40 (ml/100 g) to 45 (ml/100 g). When using a positive electrode active material whose DBP absorption is lower than 30 (ml/100 g), an effect of suppressing low-temperature high-rate cycle degradation may not be sufficiently produced. On the other hand, when the DBP absorption is higher than 50 (ml/100 g), due to interior adhesion of the obtained positive electrode active material layer, the positive electrode active material layer may more readily detach from an underlying positive electrode current collector during a battery manufacturing process or performance degradation may more readily occur during charge-discharge cycles.

In a favorable aspect of the nonaqueous electrolyte secondary battery disclosed herein, the nonaqueous electrolyte is prepared by dissolving 0.7 to 1.6 mol/L of a supporting electrolyte selected from among $LiPF_6$, $LiBF_4$, $LiClO_4$, and $LiAsF_6$ in a mixed solvent constituted by a cyclic carbonate and a chain carbonate. In this case, a nonaqueous electrolyte secondary battery in which the cycle degradation described above is suppressed can be obtained in a stable manner.

In a favorable aspect of the nonaqueous electrolyte secondary battery disclosed herein, the positive electrode active material has a secondary particle formed by an aggregation of a plurality of primary particles of a lithium transition metal oxide, a hollow portion formed in the secondary particle, and a through hole that penetrates the secondary particle so as to connect the hollow portion to the outside. According to the configuration described above, since a liquid can penetrate into the hollow portion, the DBP absorption of the positive electrode active material can be easily adjusted to a preferable range. In this case, an average opening width of the through holes may be equal to or more than 0.01 µm. In addition, an average opening width of the through holes may be equal to or less than 2.0 µm. Furthermore, an average number of through holes may range from 1 to 20 per particle of the positive electrode active material.

In a favorable aspect of the nonaqueous electrolyte secondary battery disclosed herein, the positive electrode active material is a lithium transition metal oxide which has a layered structure and which contains nickel as a structural element. Favorably, the positive electrode active material is a lithium transition metal oxide which has a layered structure and which contains nickel, cobalt, and manganese as structural elements. In this case, a nonaqueous electrolyte secondary battery in which the cycle degradation described above is suppressed can be obtained in a stable manner.

In a favorable aspect of the nonaqueous electrolyte secondary battery disclosed herein, the positive electrode is a sheet-shaped positive electrode constructed by adding a positive electrode active material layer onto a sheet-shaped positive electrode current collector, the negative electrode is a sheet-shaped negative electrode constructed by adding a negative electrode active material layer onto a sheet-shaped negative electrode current collector, and the electrode body is a wound electrode body constructed by winding the sheet-shaped positive electrode and the sheet-shaped negative electrode with a separator therebetween. With the wound electrode body, expansion and contraction associated with charge and discharge causes the nonaqueous electrolyte having penetrated into a winding center of the wound electrode body to be pushed out of the wound electrode body and electrolyte depletion is likely to occur at the winding center. Therefore, applying the configuration according to the present invention is particularly useful.

Since any of the nonaqueous electrolyte secondary batteries disclosed herein has both superior high-temperature charge-discharge cycle characteristics and superior low-temperature high-rate charge-discharge cycle characteristics as described above, any of the nonaqueous electrolyte secondary batteries is suitable as a battery to be mounted in a vehicle such as an automobile (typically, a battery to be used as a vehicle drive source). Therefore, the present invention provides a vehicle comprising any of the nonaqueous electrolyte secondary batteries disclosed herein (which may take the form of an assembled battery that is constructed by connecting a plurality of batteries). In particular, a vehicle comprising the battery as a power supply (for example, a plug-in hybrid vehicle (PHV, an electrical vehicle (EV), or the like) is provided.

Moreover, examples of favorable application objects of the technique disclosed herein include: a nonaqueous electrolyte secondary battery envisioned to be possibly used in charge-discharge cycles which include high-rate charges and discharges at 50 A or higher (for example, 50 A to 250 A) and further at 100 A or higher (for example, 100 A to 200 A); and a large-capacity nonaqueous electrolyte secondary battery which has a theoretical capacity of 1 Ah or greater (further, 3 Ah or greater) and which is envisioned to be used in charge-discharge cycles which include high-rate charges and discharges at 10 C or higher (for example, 10 C to 50 C) and further at 20 C or higher (for example, 20 C to 40 C).

DESCRIPTION OF EMBODIMENTS

Figure 1:
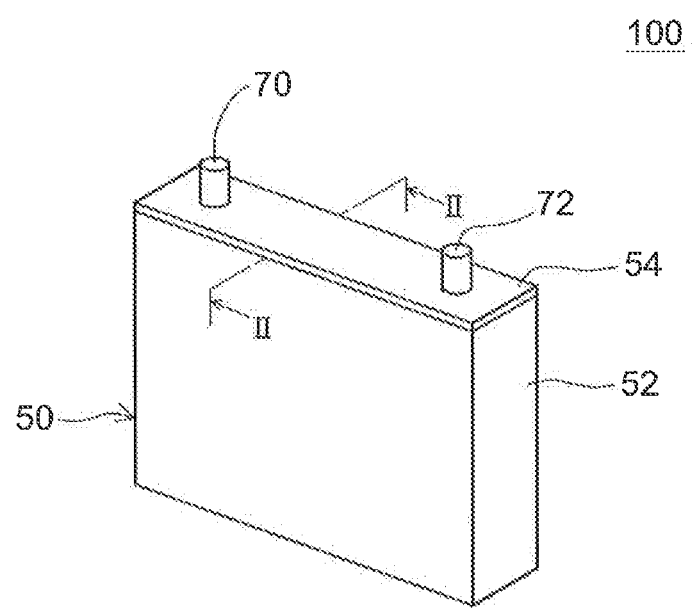
FIG. 1 is a perspective view schematically showing a nonaqueous electrolyte secondary battery according to an embodiment of the present invention.

Hereinafter, an embodiment according to the present invention will be described with reference to the drawings.

In the following drawings, members and portions that produce the same effects will be described using the same reference characters. It should be noted that dimensional relationships (length, width, thickness, and the like) shown in the respective drawings do not necessarily reflect actual dimensional relationships. In addition, any matters not specifically mentioned in the present specification but necessary for the implementation of the present invention (for example, a configuration and a method of producing an electrode body comprising a positive electrode and a negative electrode, a configuration and a method of producing a separator or an electrolyte, and general techniques related to the construction of a nonaqueous electrolyte secondary battery and other batteries) can be construed as design items for a person skilled in the art on the basis of prior art in the relevant field.

While the present invention will be described in detail below using an example of a nonaqueous electrolyte lithium secondary battery (a lithium-ion secondary battery) in a mode where a wound electrode body and a nonaqueous electrolyte are housed in a box-like case, the mode is not intended to limit the present invention thereto.

<Lithium Secondary Battery>

Figure 2:
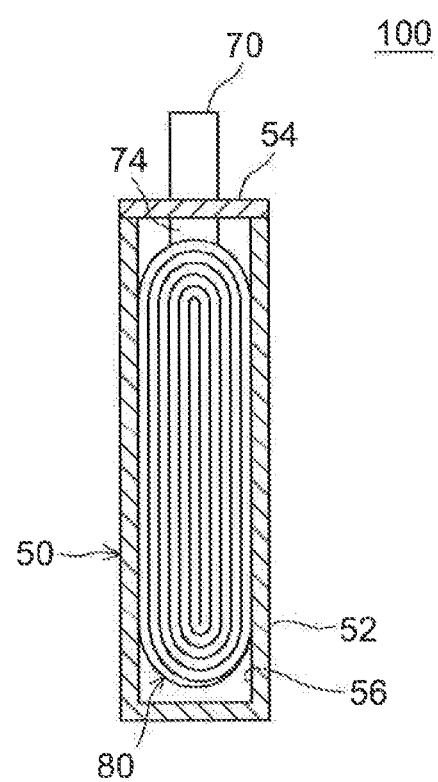
FIG. 2 is a sectional view schematically showing a cross-section taken along line II-II in FIG. 1.
Figure 3:
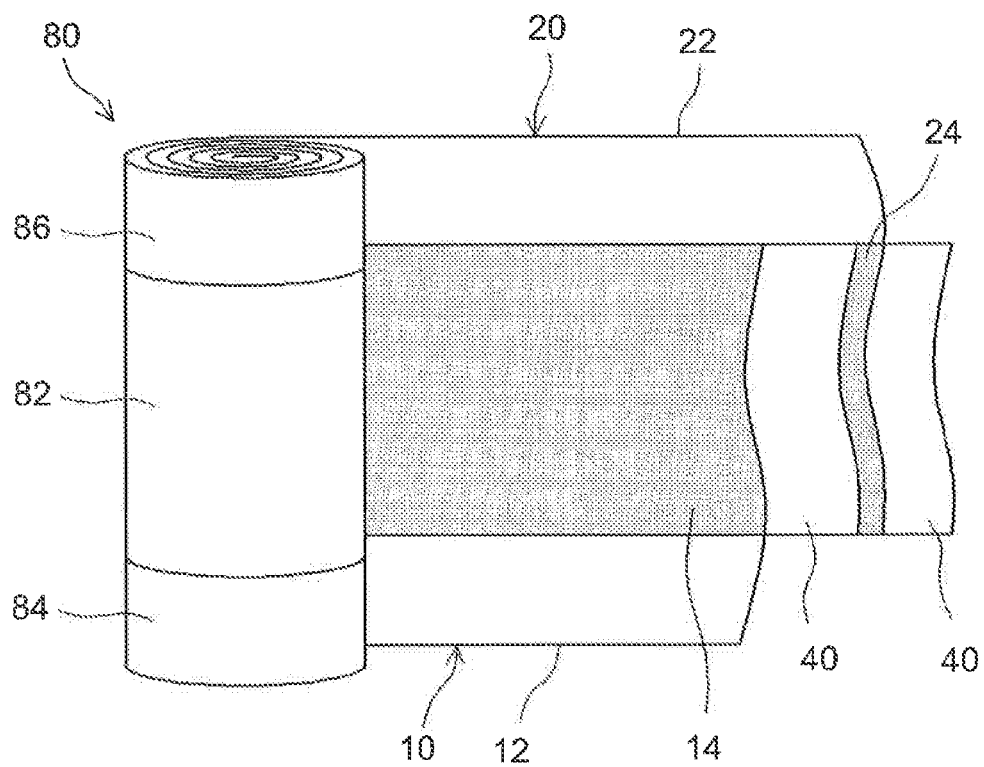
FIG. 3 is a schematic view for illustrating a wound electrode body according to an embodiment of the present invention.

A schematic configuration of a lithium secondary battery according to an embodiment of the present invention is shown in FIGS. 1 to 4. As shown in FIGS. 1 and 2, the lithium secondary battery 100 comprises a wound electrode body 80 and a battery ease 50. FIG. 2 shows a cross-section taken along line II-II in FIG. 1. In addition, FIG. 3 is a diagram showing the wound electrode body 80. The lithium secondary battery 100 is configured such that an electrode body (wound electrode body) 80 constructed by winding an elongated positive electrode sheet 10 and an elongated negative electrode sheet 20 with an elongated separator sheet 40 therebetween is housed together with a nonaqueous electrolyte (not shown) in a case 50 with a shape (a box-like shape) capable of housing the wound electrode body 80.

The case 50 comprises a bottomed box-like case main body 52 having an open upper end, and a lid body 54 that blocks the opening thereof. As a material that constitutes the case 50, a metallic material such as aluminum, steel, and nickel-plated SUS is favorably used (nickel-plated. SUS is used in the present embodiment). Alternatively, the case 50 may be molded from a resin material such as PPS or polyimide resin. A positive electrode terminal 70 which is electrically connected to the positive electrode sheet 10 of the wound electrode body 80 and a negative electrode terminal 72 which is electrically connected to the negative electrode sheet 20 of the wound electrode body 80 are provided on an upper surface (in other words, the lid body 54) of the case 50. The wound electrode body 80 is housed together with a nonaqueous electrolyte (not shown) inside the case 50.

<Wound Electrode Body>

As shown in FIG. 3, the wound electrode body 80 according to the present embodiment has an elongated (band-shaped) sheet structure prior to assembly of the wound electrode body 80.

The positive electrode sheet 10 has a structure in which a positive electrode active material layer 14 containing a positive electrode active material is retained on both surfaces of an elongated sheet-shaped foil-like positive electrode current collector 12. However, the positive electrode active material layer 14 is not attached to one side edge (a lower side edge portion in the drawing) along an end side of the positive electrode sheet 10 in a width direction, and an positive electrode active material layer unformed section is formed in which the positive electrode current collector 12 is exposed at a constant width.

In a similar manner to the positive electrode sheet 10, the negative electrode sheet 20 also has a structure in which a negative electrode active material layer 24 containing a negative electrode active material is retained on both surfaces of an elongated sheet-shaped foil-like negative electrode current collector 22. However, the negative electrode active material layer 24 is not attached to one side edge (an upper side edge portion in the drawing) along an end side of the negative electrode sheet 20 in a width direction, and a negative electrode active material layer unformed section is formed in which the negative electrode current collector 22 is exposed at a constant width.

When fabricating the wound electrode body 80, as shown in FIG. 3, the positive electrode sheet 10 and the negative electrode sheet 20 are laminated with the separator sheet 40 therebetween. In doing so, the positive electrode sheet 10 and the negative electrode sheet 20 are overlapped slightly displaced in a width direction so that a positive electrode mixture layer unformed section of the positive electrode sheet 10 and a negative electrode mixture layer unformed section of the negative electrode sheet 20 respectively protrude from both sides of the separator sheet 40 in the width direction. The flat-shaped wound electrode body 80 can be fabricated by winding a laminate that has been laminated in this manner and subsequently squashing the resulting wound body in a direction of side surfaces thereof.

Figure 4:
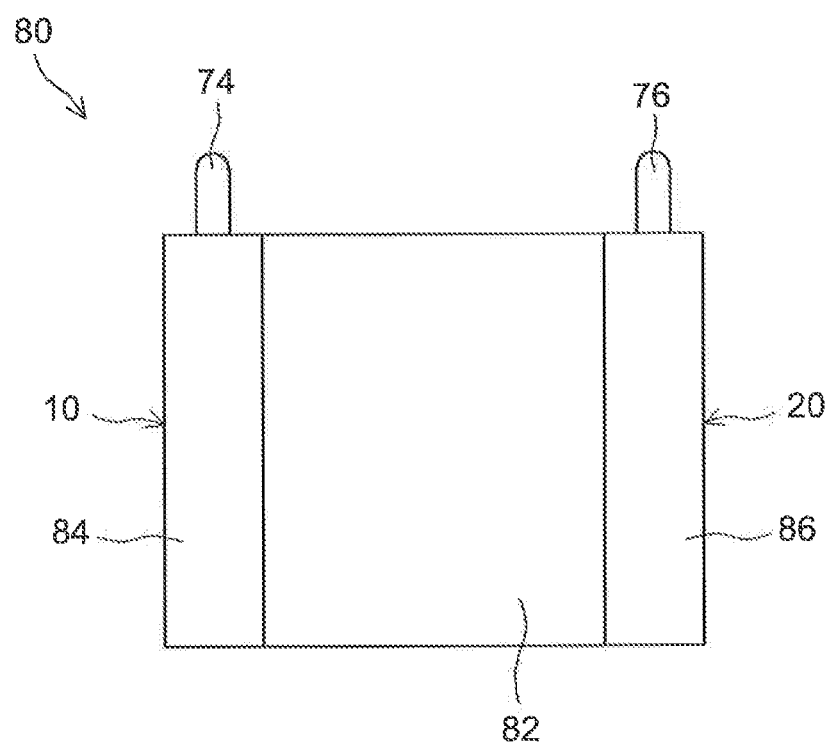
FIG. 4 is a front view schematically showing a wound electrode body according to an embodiment of the present invention.

A wound core portion 82 that is, a portion in which the positive electrode active material layer 14 of the positive electrode sheet 10, the negative electrode active material layer 24 of the negative electrode sheet 20, and the separator sheet 40 are tightly laminated) is formed in a central portion of the wound electrode body 80 in a winding axis direction. In addition, the electrode active material layer unformed sections of the positive electrode sheet 10 and the negative electrode sheet 20 respectively protrude outward from the wound core portion 82 at both ends of the wound electrode body 80 in the winding axis direction. As shown in FIG. 4, a positive electrode lead terminal 74 and a negative electrode lead terminal 76 are respectively annexed to the positive electrode-side protruding portion (in other words, the unformed section of the positive electrode active material layer 14) 84 and the negative electrode-side protruding portion (in other words, the unformed section of the negative electrode active material layer 24) 86, and are respectively electrically connected to the positive electrode terminal 70 and the negative electrode terminal 72 described above.

Components constituting the wound electrode body 80 may be similar to those of a wound electrode body of a conventional lithium secondary battery with the exception of the positive electrode sheet 10, and are not particularly limited.

<Positive Electrode Sheet>

The positive electrode sheet 10 can be formed by attaching a positive electrode active material layer 14 having a lithium secondary battery positive electrode active material as a main constituent on top of the elongated positive electrode current collector 12. An aluminum foil or other metallic foils suitable for a positive electrode is preferably used as the positive electrode current collector 12. In the present embodiment, a sheet-shaped aluminum positive electrode current collector 12 is used. For example, an aluminum sheet with a thickness ranging from about 10 μm to 30 μm can be preferably used.

<Positive Electrode Active Material Layer>

The positive electrode active material layer 14 is constituted by a positive electrode active material and other positive electrode active material layer-forming constituents (for example, a binder or an electrically conductive material) which are used as necessary. As the positive electrode active material, one, two or more materials conventionally used in lithium secondary batteries can be used without particular limitation with the exception of DBP absorption (to be described later) satisfying a predetermined range. Favorable application objects of the technique disclosed herein include positive electrode active materials mainly constituted by an oxide that includes lithium and a transition metal element as structural metal elements (a lithium-containing transition metal oxide) such as lithium-manganese oxide ($LiMn_2O_4$), lithium-cobalt oxide ($LiCoO_2$), and lithium-nickel oxide ($LiNiO_2$). In particular, application to a positive electrode active material mainly constituted by a lithium-nickel-cobalt-manganese complex oxide (for example, $LiNi_{1/3}Co_{1/3}Mn_{1/3}O_2$) (typically, a positive electrode active material substantially made of a lithium-nickel-cobalt-manganese complex oxide) is favorable.

In this case, the term "lithium-nickel-cobalt-manganese complex oxide" is used so as to include oxides containing Li, Ni, Co, and Mn as structural metal elements as well as oxides containing at least one metal element other than Li, Ni, Co, and Mn (in other words, a transition metal element and/or a representative metal element other than Li, Ni, Co, and Mn). For example, the metal element described above can be one, two or more metal elements selected from a group including Al, Cr, Fe, V, Mg, Ti, Zr, Nb, Mo, W, Cu, Zn, Ga, In, Sn, La and Ce. The same description applies to the terms "lithium-nickel oxide", "lithium-cobalt oxide", and "lithium-manganese oxide".

As such a lithium transition metal compound (typically, particulate), for example, a lithium transition metal compound powder prepared by a conventionally known method may be used without modification. For example, a lithium transition metal compound powder substantially constituted by secondary particles with an average particle diameter ranging from approximately 1 μm to 25 μm can be favorably used as the positive electrode active material.

The positive electrode active material layer 14 can contain, as necessary, one, two or more materials which may be used as structural components of a positive electrode active material layer in a general lithium secondary battery. An example of such materials is an electrically conductive material. A carbon material such as carbon powder and carbon fiber is favorably used as the electrically conductive material. Alternatively, an electrically conductive metal powder such as nickel powder and the like may be used. Other materials which may be used as a component of the positive electrode active material layer include various polymer materials capable of functioning as a binder of the constituent materials described above.

Although not particularly limited, a proportion of the positive electrode active material among the entire positive electrode active material layer is favorably equal to or greater than approximately 50% by mass (typically, from 50% by mass to 95% by mass) and more favorably ranges from approximately 75% by mass to 90% by mass. In addition, in the case of a positive electrode active material layer with a composition including an electrically conductive material, for example, a proportion of the electrically conductive material in the positive electrode active material layer may be set so as to range from 3% by mass to 25% by mass and favorably to range from approximately 3% by mass to 15% by mass. Furthermore, when there are positive electrode active material layer-forming constituents (such as a polymer material) other than the positive electrode active material and the electrically conductive material, a total content of such arbitrary constituents is favorably equal to or lower than approximately 7% by mass and more favorably equal to or lower than approximately 5% by mass (for example, from approximately 1% by mass to 5% by mass).

A thickness of the positive electrode active material layer favorably ranges from 45 μm to 240 μm and particularly favorably ranges from approximately 100 μm to 200 μm. In addition, a porosity of the positive electrode active material layer favorably ranges from 20% to 60% and particularly favorably ranges from approximately 30% to 55%. An excessively, low porosity of the positive electrode active material layer may cause ion permeability of the positive electrode active material layer to decline, while an excessively high porosity of the positive electrode active material layer may cause mechanical strength of the positive electrode active material layer to decline.

As a method of forming the positive electrode active material layer 14, a method can be favorably adopted where a positive electrode active material layer-forming paste in which a positive electrode active material (typically, granular) and other positive electrode active material layer-forming constituents are dispersed in a suitable solvent (favorably; an aqueous solvent) is applied in a band-like pattern on one or both surfaces (in this case, both surfaces) of the positive electrode current collector 12 and then dried. After drying the positive electrode active material layer-forming paste, the thickness and density of the positive electrode active material layer 14 can be adjusted by performing a suitable pressing process (for example, various conventionally known pressing methods such as a roll pressing method and a plate pressing method can be adopted).

<Negative Electrode Sheet>

In a similar manner to the positive electrode sheet 10, the negative electrode sheet 20 is also formed by attaching a negative electrode active material layer 24 to both surfaces of an elongated sheet-shaped foil-like negative electrode current collector 22. However, the negative electrode active material layer 24 is not attached to one side edge along an end side of the sheet-shaped electrode body in a width direction, and the negative electrode current collector 22 is exposed at a constant width.

A copper foil (present embodiment) or other metallic foils suitable for a negative electrode is preferably used as the negative electrode current collector 22. In the present embodiment, a sheet-shaped copper negative electrode current collector 22 is used. For example, a copper sheet with a thickness ranging from about 5 μm to 30 μm can be preferably used.

<Negative Electrode Active Material Layer>

The negative electrode active material layer 24 is constituted by a negative electrode active material and other negative electrode active material layer-forming constituents (for example, a binder) which are used as necessary. As the negative electrode active material, one, two or more types of materials conventionally used in a lithium secondary battery can be used without any particular limitation. Preferable examples include carbon-based materials such as carbon graphite and amorphous carbon (graphite in the present embodiment), lithium-containing transition metal oxides, transition metal nitrides, and the like. While the amount of the negative electrode active material included in the negative electrode active material layer is not particularly limited, the amount of the negative electrode active material ranges from around 90% by mass to 99% by mass and more favorably ranges from 95% by mass to 99% by mass.

A thickness of the negative electrode active material layer favorably ranges from 50 μm to 210 μm and particularly favorably ranges from approximately 90 μl to 190 μm. In addition, a porosity of the negative electrode active material layer favorably ranges from 20% to 60% and particularly favorably ranges from approximately 25% to 55%. An excessively low porosity of the negative electrode active material layer may cause ion permeability of the negative electrode active material layer to decline, while an excessively high porosity of the negative electrode active material layer may cause mechanical strength of the negative electrode active material layer to decline.

As a method of forming the negative electrode active material layer 24, a method can be favorably adopted where a negative electrode active material layer-forming paste in which a negative electrode active material (typically, granular) and other negative electrode active material layer-forming constituents are dispersed in a suitable solvent is applied in a band-like pattern on one or both surfaces (in this case, both surfaces) of the negative electrode current collector 22 and then dried. After drying the negative electrode active material layer-forming paste, the thickness and density of the negative electrode active material layer 24 can be adjusted by performing a suitable pressing process (for example, various conventionally known pressing methods such as a roll pressing method and a plate pressing method can be adopted).

<Separator Sheet>

Examples of a preferable separator sheet 40 that is used between the positive and negative electrode sheets 10 and 20 include a separator sheet 40 constituted by a porous polyolefin-based resin. For example, a porous separator sheet made of synthetic resin (for example, a polyolefin such as polyethylene (PE) or polypropylene (PP)) can be preferably used. The separator sheet 40 may have a single layer construction or a multi-layer construction. For example, a triple layer construction may be adopted which includes a polypropylene (PP) layer, a polyethylene (PE) layer laminated on the polypropylene (PP) layer, and a polypropylene (PP) layer laminated on the polyethylene (PE) layer.

<Nonaqueous Electrolyte>

The wound electrode body 80 configured as described above is housed in the case main body 52, and an appropriate nonaqueous electrolyte is arranged inside (introduced into) the case main body 52. The nonaqueous electrolyte that is housed in the case main body 52 together with the wound electrode body 80 includes a lithium salt as a supporting electrolyte in an organic solvent (a nonaqueous solvent). As the lithium salt, for example, known lithium salts conventionally used as a supporting electrolyte of a nonaqueous electrolyte of a lithium secondary battery can be selected and used as appropriate. Examples of the lithium salt include $LiPF_6$, $LiBF_4$, $LiClO_4$, $LiAsF_6$, $Li(CF_3SO_2)_2N$, $LiCF_3SO_3$, $LiC_4F_9SO_3$, $LiN(CF_3SO_2)_2$, $LiC(CF_3SO_2)_3$, and $LiI$. Only one of the supporting electrolytes listed above may be used independently, or two or more of the supporting electrolytes may be used in combination with each other. Particularly favorable examples include $LiPF_6$, $LiBF_4$, $LiClO_4$, and $LiAsF_6$. These supporting electrolytes are capable of producing high ion conductivity and improving cycle characteristics and are therefore favorable. The nonaqueous electrolyte is favorably prepared so that, for example, a concentration of the supporting electrolyte ranges from 0.7 to 1.6 mol/L.

As the nonaqueous solvent, organic solvents used in a general lithium secondary battery can be selected and used as appropriate. Examples of particularly favorable nonaqueous solvents include cyclic carbonates such as ethylene carbonate (EC), propylene carbonate (PC), and butylene carbonate, and chain carbonates such as dimethyl carbonate (DMC) and ethyl methyl carbonate (EMC). Only one of these organic solvents may be used independently, or two or more of the organic solvents may be used in combination with each other. In particular, a mixed solvent constituted by a cyclic carbonate and a chain carbonate is favorably used. For example, a nonaqueous electrolyte in which $LiPF_6$ as a supporting electrolyte is contained at a concentration ranging from 0.7 to 1.6 mol/L (for example, approximately 1 mol/L) in a mixed solvent containing EC, EMC, and DMC at a volume ratio of 3:4:3 can be favorably used.

By housing the nonaqueous electrolyte together with the wound electrode body 80 in the case main body 52 and sealing the opening of the case main body 52 with the lid body 54, the construction (assembly) of the lithium secondary battery 100 according to the present embodiment is completed. Moreover, the sealing process of the case main body 52 and the arrangement (introduction) process of the electrolyte can be performed in a similar manner to methods used when manufacturing a conventional lithium secondary battery. Subsequently, conditioning (initial charge and discharge) of the battery is performed. Processes such as degassing and quality inspecting may be performed as necessary.

Hereinafter, features of a lithium secondary battery according to the present embodiment will be described.

In the present embodiment, among the nonaqueous electrolyte housed in the battery case 50, an electrolyte amount ratio (A/B) between a surplus electrolyte amount (A) that exists outside the wound electrode body and an intra-electrode body electrolyte amount (B) impregnating the wound electrode body ranges from 0.05 to 0.2. In addition, the DBP absorption of the positive electrode active material constituting the positive electrode sheet 10 ranges from 30 (ml/100 g) to 50 (ml/100 g). Hereinafter, the surplus electrolyte amount/intra-electrode body electrolyte amount ratio (A/B) and the DBP absorption of the positive electrode active material will be described in sequence.

<Surplus Electrolyte Amount/Intra-electrode Body Electrolyte Amount Ratio>

The surplus electrolyte amount/intra-electrode body electrolyte amount ratio is a ratio of the surplus electrolyte amount A to the intra-electrode body electrolyte amount B and is expressed as A/B. In this case, the intra-electrode body electrolyte refers to the electrolyte impregnating (absorbed and retained by) the electrode body. In addition, the surplus electrolyte refers to the electrolyte which is capable of circulating around the electrode body and which exists in regions other than the electrode body (in other words, not impregnating the electrode body). For example, the surplus electrolyte may be arranged in a gap between an inner wall 56 (FIG. 2) of the battery case and the wound electrode body 80. The surplus electrolyte amount A and the intra-electrode body electrolyte amount B can be measured according to the following procedures.

Procedure 1: House the wound electrode body 80 in the case main body 52.

Procedure 2: Introduce an arbitrary amount X of a nonaqueous electrolyte into the case main body 52, allow the nonaqueous electrolyte to penetrate into the wound electrode body 80, and let stand for 24 hours.

Procedure 3: Tilt the case main body 52 to discharge surplus nonaqueous electrolyte that has not penetrated into the wound electrode body 80.

In this case, the amount of the surplus nonaqueous electrolyte discharged from the case main body 52 corresponds to the surplus electrolyte amount A and a value (X−A) obtained by subtracting the surplus electrolyte amount A from the arbitrary amount X initially introduced into the case main body 52 corresponds to the intra-electrode body electrolyte amount B. Moreover, the electrolyte amounts may be based on volume or based on mass. Volume-based amounts and mass-based amounts are interchangeable by converting the specific gravity of the electrolyte.

<DBP Absorption of Positive Electrode Active Material>

DBP absorption (mL/100 g) is obtained in compliance with JIS K62174 "Carbon Black for Rubber Industry—Fundamental Characteristics—Part 4: Determination of DBP Absorption". In this case, DBP (dibutylphthalate) is used as a reagent solution to be titrated using a constant-rate burette onto a test object powder and a variation in viscosity characteristics is measured by a torque detector. In addition, an additive amount of the reagent solution per unit weight of the test object powder corresponding to a torque equivalent to 70% of a maximum generated torque is adopted as the DBP absorption (mL/100 g). For example, an absorption tester S410 manufactured by Asahisouken Co., Ltd. may be used as the DBP absorption measuring instrument. The DBP absorption indicates how much of the electrolyte impregnating the positive electrode active material layer can be absorbed by the positive electrode active material. In other words, the higher the DBP absorption, the more readily the electrolyte impregnating the positive electrode active material layer is absorbed by the positive electrode active material.

With the lithium secondary battery 100 according to the present embodiment, among the nonaqueous electrolyte housed in the battery case 50, an electrolyte amount ratio A/B between the surplus electrolyte amount A that exists outside the wound electrode body 80 and the intra-electrode body electrolyte amount B impregnating the wound electrode body 80 ranges from 0.05 to 0.2. In addition, the DBP absorption of the positive electrode active material constituting the positive electrode sheet 10 is equal to or higher than 30 (ml/100 g).

According to the configuration described above, since the electrolyte amount ratio A/B between the surplus electrolyte amount A that exists outside the electrode body 80 and the intra-electrode body electrolyte amount B impregnating the electrode body 80 ranges from 0.05 to 0.2, a surplus electrolyte amount that exists in a free state outside the electrode body 80 increases. Therefore, even if electrolyte depletion occurs at the electrode body 80 due to repetitive charge and discharge, the intra-electrode body electrolyte amount can be promptly restored by replenishing the electrolyte from the surplus electrolyte as appropriate. As a result, capacity degradation due to charge-discharge cycles particularly at high temperatures (for example, around 60° C.) can be reduced.

However, test examples (to be described later) confirmed that simply increasing the surplus electrolyte amount causes performance degradation due to high-rate charge-discharge cycles particularly at low temperatures (for example, around −15° C.). The reasons for low-temperature high-rate charge-discharge cycle degradation due to an increase in the surplus electrolyte amount are not necessarily clear. However, since an increase in the surplus electrolyte amount makes it easier for lithium ions to escape from the positive electrode to the outside, a shortage of lithium ions in the positive electrode active material layer 14 is assumed to be a cause of the degradation.

In consideration thereof, in the present embodiment, the DBP absorption of the positive electrode active material constituting the positive electrode sheet 10 is set so as to equal or exceed 30 (ml/100 g). Using a positive electrode active material whose DBP absorption is equal to or higher than this predetermined value facilitates absorption of the nonaqueous electrolyte impregnating the positive electrode active material layer 14 by the positive electrode active material and suppresses the occurrence of electrolyte depletion (ion shortage) in the positive electrode active material layer 14. As a result, although the configuration includes surplus electrolyte, performance degradation particularly due to low-temperature high-rate charge-discharge cycles can be suppressed.

The electrolyte amount ratio (A/B) described above appropriately ranges from approximately 0.05 to 0.2 and favorably ranges from 0.068 to 0.19. When the electrolyte amount ratio (A/B) is too low, the intra-electrode body electrolyte amount cannot be promptly restored upon electrolyte depletion and performance degradation may occur during a high-temperature cycle. On the other hand, when the electrolyte amount ratio (A/B) is too high, low-temperature high-rate cycle characteristics may decline. From the perspective of producing favorable high-temperature cycle characteristics, the electrolyte amount ratio (A/B) is appropriately equal to or higher than 0.05, favorably equal to or higher than 0.068, and particularly favorably equal to or higher than 0.14. On the other hand, from the perspective of producing favorable low-temperature high-rate cycle characteristics, the electrolyte amount ratio (A/B) is appropriately equal to or lower than 0.2, favorably equal to or lower than 0.19, and particularly favorably equal to or lower than 0.14. From the perspective of achieving a balance between high-temperature cycle characteristics and low-temperature high-rate cycle characteristics, the electrolyte amount ratio (A/B) described above appropriately ranges from 0.05 to 0.2, favorably ranges from 0.068 to 0.19, and particularly favorably ranges from 0.1 to 0.15.

In addition, the DBP absorption of the positive electrode active material described above appropriately ranges from 30 (ml/100 g) to 50 (ml/100 g), favorably ranges from 36 (ml/100 g) to 50 (ml/100 g), and particularly favorably ranges from 40 (ml/100 g) to 45 (ml/100 g). When using a positive electrode active material whose DBP absorption is lower than 30 (ml/100 g), an effect of suppressing low-temperature high-rate cycle degradation may not be sufficiently produced. On the other hand, when the DBP absorption is higher than 50 (ml/100 g), due to inferior adhesion of the obtained positive electrode active material layer, the positive electrode active material layer may more readily detach from an underlying positive electrode current collector during a battery manufacturing process or performance degradation may more readily occur during charge-discharge cycles.

Hereinafter, the present invention will be described in greater detail based on test examples. The test examples were performed in order to study the effects, if any, of the DBP absorption of the positive electrode active material and the surplus electrolyte amount/intra-electrode body electrolyte amount ratio (A/B) on cycle characteristics of a lithium secondary battery.

In the test examples, active material particles having a composition represented by $Li_{1.15}Ni_{0.33}Co_{0.33}Mn_{0.33}O_2$ was used as the positive electrode active material. However, by elaborating a generation process of the active material particles, positive electrode active materials with respectively different structures were prepared by giving secondary particles of the active material particles a hollow shape, producing near-spherical particles, and producing deformed particles. Such structural differences create a variation in the DBP absorption (ml/100 g) of the positive electrode active material. In this case, positive electrode active materials respectively having DBP absorption of "26 (ml/100 g)", "30 (ml/100 g)", "36 (mL/100 g)", "45 (ml/100 g)", and "54 (ml/100 g)" were prepared.

In addition, test lithium secondary batteries were fabricated by varying the surplus electrolyte amount/intra-electrode body electrolyte amount ratio (A/B). Subsequently, cycle tests were performed using the test batteries to evaluate the effects, if any, of the DBP absorption of the positive electrode active materials and the surplus electrolyte amount/intra-electrode body electrolyte amount ratio (A/B) on battery performance.

EXAMPLE 1

[Positive Electrode Sheet]

In the present example, $Li_{1.15}Ni_{0.33}Co_{0.33}Mn_{0.33}O_2$ powder with DBP absorption of 26 (ml/100 g) and an average particle diameter of around 6 μm was used as the positive electrode active material. First, a positive electrode active material layer-forming paste was prepared by mixing $Li_{1.15}Ni_{0.33}Co_{0.33}Mn_{0.33}O_2$ powder as the positive electrode active material, acetylene black (AB) as an electrically conductive material, and polyvinylidene fluoride (PVdF) as a binder in N-methyl-2-pyrrolidone (NMP) so that the materials assumed a mass ratio of 87:10:3. The positive electrode active material layer-forming paste was applied in a band-shape to both surfaces of an elongated sheet-shaped aluminum foil with a thickness of 15 μm and subsequently dried to fabricate the positive electrode sheet 10 in which the positive electrode active material layer 14 is provided on both surfaces of the positive electrode current collector 12. The coating amounts (application quantities) of the positive electrode active material layer 14 were adjusted so as to have a combined total of approximately 30 mg/cm² (based on the solid content) for both sides. After drying, pressing was performed so that the positive electrode active material layer 14 acquired a porosity of approximately 30%.

[Negative Electrode Sheet]

Graphite powder with an average particle diameter of around 10 μm was used as the negative electrode active material. First, a negative electrode active material layer paste was prepared by dispersing graphite powder as the negative electrode active material, styrene butadiene rubber (SBR) as a binder, and carboxymethyl cellulose (CMC) as a thickener into water so that the materials assumed a mass ratio of 98:1:1. The negative electrode active material layer paste was applied to both surfaces of an elongated sheet-shaped copper foil (the negative electrode current collector 22) with a thickness of 20 μm to fabricate the negative electrode sheet 20 in which the negative electrode active material layer 24 is provided on both surfaces of the negative electrode current collector 22. The coating amounts (application quantities) of the negative electrode active material layer 24 were adjusted so as to have a combined total of approximately 25 mg/cm² (based on the solid content) for both sides. After drying, pressing was performed so that the negative electrode active material layer 24 acquired a porosity of approximately 35%.

[Lithium Secondary Battery]

A flat-shaped wound electrode body 80 was fabricated by winding the positive electrode sheet 10 and the negative electrode sheet 20 with two separator sheets (porous polypropylene) 40 therebetween and then squashing the obtained wound body in a direction of side surfaces thereof. The wound electrode body 80 obtained in this manner was housed in a battery case 50 together with a nonaqueous electrolyte and the opening of the battery case 50 was hermetically sealed. As the nonaqueous electrolyte, a nonaqueous electrolyte prepared by incorporating $LiPF_6$ as a supporting electrolyte at a concentration of approximately 1 mol/liter into a mixed solvent containing ethylene carbonate (EC), ethyl methyl carbonate (EMC), and dimethyl carbonate (DMC) at a volume ratio of 3:4:3 was used. Subsequently, a test lithium secondary battery was obtained by performing an initial charge and discharge process (conditioning) according to a conventional method.

In addition, in the present example, lithium secondary batteries were fabricated in which the ratio A/B between the surplus electrolyte amount A that exists outside the wound electrode body 80 and the intra-electrode body electrolyte amount B impregnating the wound electrode body 80 differed from one another. Specifically, a total of five lithium secondary batteries were fabricated with respective surplus electrolyte amount/infra-electrode body electrolyte amount ratios (A/B) of "0.008", "0.068", "0.142", "0.19", and "0.275". The surplus electrolyte amount/intra-electrode body electrolyte amount ratio (A/B) was adjusted by varying the amount of the nonaqueous electrolyte introduced into the battery case 50. The method of measuring the surplus electrolyte amount A and the intra-electrode body electrolyte amount B is as described earlier.

EXAMPLE 2

A lithium secondary battery was fabricated in a similar manner to Example 1 with the exception of using positive electrode active material particles with DBP absorption of 30 (ml/100 g) and an average particle diameter of around 6 μm.

EXAMPLE 3

A lithium secondary battery was fabricated in a similar manner to Example 1 with the exception of using positive electrode active material particles with DBP absorption of 36 (ml/100 g) and an average particle diameter of around 6 μm.

EXAMPLE 4

A lithium secondary battery was fabricated in a similar manner to Example 1 with the exception of using positive electrode active material particles with DBP absorption of 45 (ml/100 g) and an average particle diameter of around 6 μm.

EXAMPLE 5

A lithium secondary battery was fabricated in a similar manner to Example 1 with the exception of using positive electrode active material particles with DBP absorption of 54 (ml/100 g) and an average particle diameter of around 6 μm.

[Measurement of Initial Capacity]

Initial capacity was measured for test lithium secondary batteries of each example obtained as described above. First, charge was performed in an environmental atmosphere of 25° C. on a constant-current, constant-voltage basis at a current of 1 C and a voltage of 4.1 V until charge time reached three hours. After a pause of 10 minutes, the charged battery was discharged at 25° C. at a constant current of ⅓ C to 3 V until discharge time reached six hours, and after a pause of 10 minutes, the discharged battery was further discharged on a constant-current, constant-voltage basis at a current of ⅓ C and a voltage of 3 V until discharge time reached four hours. A discharge capacity at this point was measured as an initial capacity.

[Measurement of Initial Resistance]

In addition, an initial resistance was measured for the test lithium secondary batteries of each example. First, in an environmental atmosphere of 25° C., each battery was adjusted to a charged state of state of charge (SOC) 60% by constant-current, constant-voltage (CC-CV) charge. Subsequently, discharge was performed at 25° C. for 10 seconds at current values of 0.3 C, 1 C, and 3 C and a voltage value 10 seconds after the start of discharge was measured. Each measurement point (current value (I), voltage value (V)) was plotted on an I-V characteristic graph (a graph with an abscissa (X axis) representing I and an ordinate (Y axis) representing V). An approximation straight line passing through the respective points was drawn, and an initial resistance value was calculated based on a slope of the approximation straight line.

[High-temperature Cycle Test]

Figure 5:
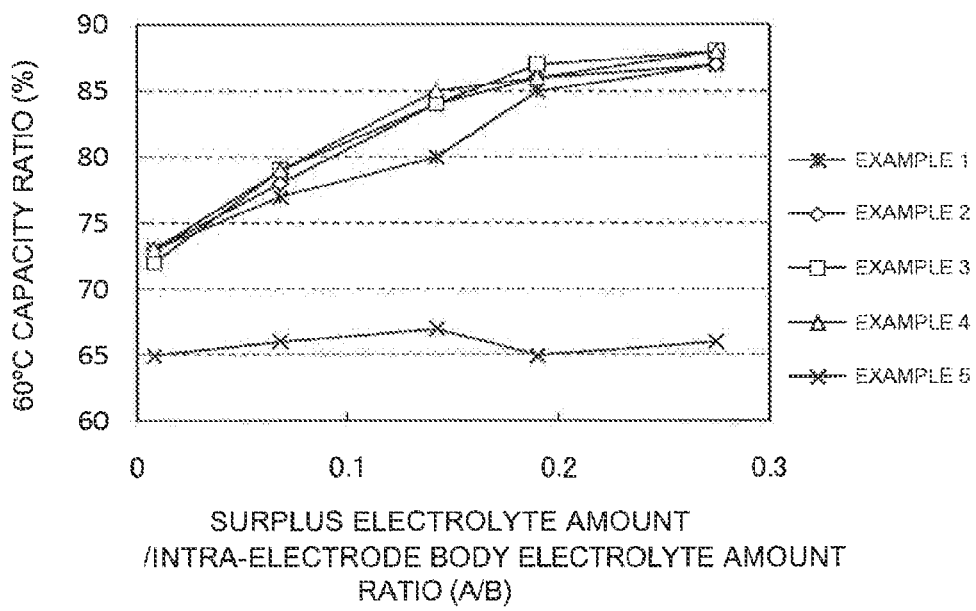
FIG. 5 is a graph showing a relationship between surplus electrolyte amount/intra-electrode body electrolyte amount ratio (A/B) and capacity ratio.

Furthermore, a cycle test involving repetitive charge and discharge in a 60° C. temperature atmosphere was performed on the test lithium secondary batteries of each example. Specifically, a charge-discharge cycle involving performing a CC charge at a constant current of 2 C until 4.1 V in a 60° C. thermostatic bath, performing a CC discharge at 2 C until 3.0 V, and pausing for 10 minutes was continuously repeated 5000 times. A discharge capacity after the charge-discharge cycle test was measured under the same conditions as the initial capacity measurement described earlier. Subsequently, based on the discharge capacity after the charge-discharge cycle test and on the initial capacity, a capacity ratio ("discharge capacity after charge-discharge cycle test/initial capacity"×100) was calculated. Results thereof are shown in Table 1. FIG. 5 is a graph showing a relationship between surplus electrolyte amount/intra-electrode body electrolyte amount ratio (A/B) and capacity ratio.

TABLE 1

<60° C. Cycle characteristics_Capacity ratio (%)>

|  |  | Example 1 | Example 2 | Example 3 | Example 4 | Example 5 |
|---|---|---|---|---|---|---|
| DBP absorption (ml/100 g) | | 26 | 30 | 36 | 45 | 54 |
| Electrolyte amount ratio A/B | 0.008 | 73 | 73 | 72 | 73 | 65 |
| | 0.068 | 77 | 78 | 79 | 79 | 66 |
| | 0.142 | 80 | 84 | 84 | 85 | 67 |
| | 0.19 | 85 | 86 | 87 | 86 | 65 |
| | 0.275 | 87 | 87 | 88 | 88 | 66 |

As is apparent from FIG. 5 and Table 1, the batteries according to Examples 1 to 4 exhibited an increasing trend in capacity ratio as the surplus electrolyte amount/intra-electrode body electrolyte amount ratio (A/B) increased. With the batteries under test, capacity ratio exceeded 77% when the surplus electrolyte amount/infra-electrode body electrolyte amount ratio (A/B) was set so as to equal or exceed 0.068. In particular, an extremely high capacity ratio of 80% or higher was achieved by setting the surplus electrolyte amount/intra-electrode body electrolyte amount ratio (A/B) so as to equal or exceed 0.142. These results show that the surplus electrolyte amount/intra-electrode body electrolyte amount ratio (A/B) is appropriately equal to or higher than 0.05, favorably equal to or higher than 0.068, and particularly favorably equal to or higher than 0.142. Moreover, with the battery according to Example 5 using the positive electrode active material with DBP absorption of 54 (ml/100 g), wrinkles and separation occurred during pressing of the positive electrode active material layer. Consequently, the capacity ratio after cycles significantly declined as compared to the other Examples 1 to 4. As a result, the DBP absorption of the positive electrode active material is favorably set so as to equal or fall below approximately 50 (ml/100 g).

[Low-temperature High-rate Cycle Test]

Figure 6:
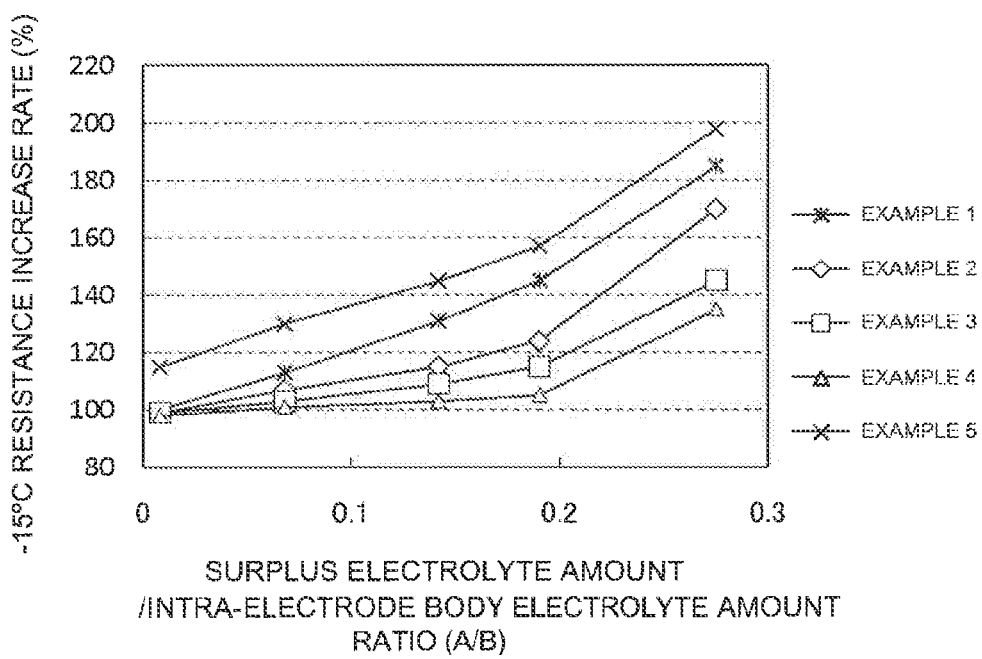
FIG. 6 is a graph showing a relationship between surplus electrolyte amount/intra-electrode body electrolyte amount ratio (A/B) and resistance increase rate.
Figure 7:
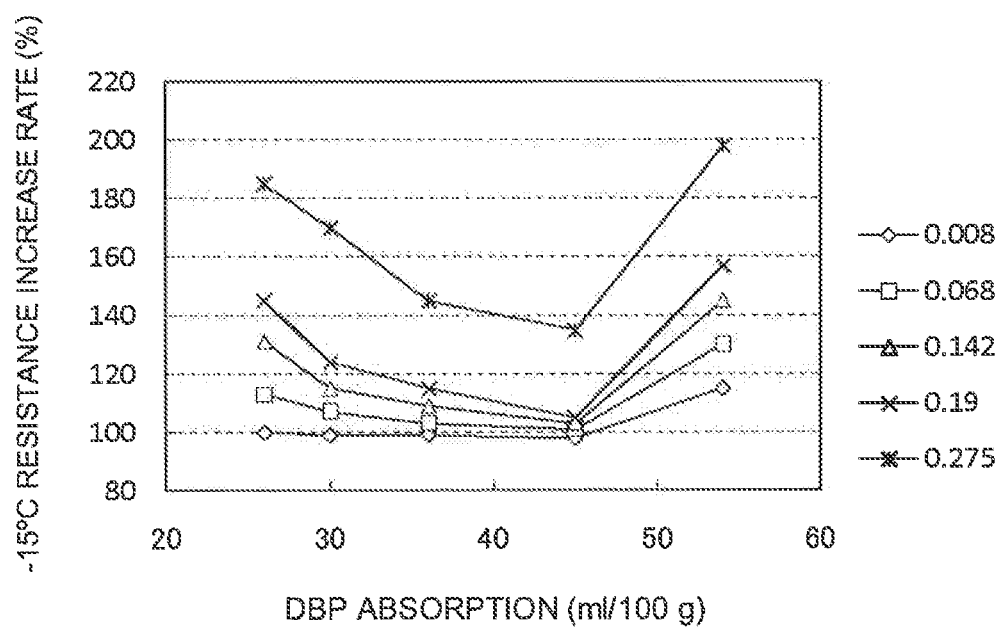
FIG. 7 is a graph showing a relationship between DBP absorption and resistance increase rate.

In addition, test lithium secondary batteries according to the respective examples were separately fabricated and a cycle test involving repetitive high-rate charge and discharge in a −15° C. temperature atmosphere was performed. Specifically, in a −15° C. thermostatic bath, a high-rate charge-discharge cycle involving performing a CC discharge at 20 C for 20 seconds and performing a CC charge at 20 C for 20 seconds was continuously repeated 5000 times. An IV resistance after the charge-discharge cycle test was measured under the same conditions as the initial resistance measurement described earlier. Subsequently, based on the IV resistance after the charge-discharge cycle test and on the initial resistance, a resistance increase rate ("IV resistance after charge-discharge cycle test/initial resistance"×100) was calculated. Results are shown in Table 2 and FIGS. 6 and 7. FIG. 6 is a graph showing a relationship between surplus electrolyte amount/infra-electrode body electrolyte amount ratio (A/B) and resistance increase rate, and FIG. 7 is a graph showing a relationship between DBP absorption of positive electrode active material and resistance increase rate.

TABLE 2

<−15° C. High-rate cycle characteristics_Resistance increase rate (%)>

|  |  | Example 1 | Example 2 | Example 3 | Example 4 | Example 5 |
|---|---|---|---|---|---|---|
| DBP absorption (ml/100 g) | | 26 | 30 | 36 | 45 | 54 |
| Electrolyte amount ratio A/B | 0.008 | 100 | 99 | 99 | 98 | 115 |
| | 0.068 | 113 | 107 | 103 | 101 | 130 |
| | 0.142 | 131 | 115 | 109 | 103 | 145 |
| | 0.19 | 145 | 124 | 115 | 105 | 157 |
| | 0.275 | 185 | 170 | 145 | 135 | 198 |

As shown in FIG. 6 and Table 2, the batteries according to Examples 1 to 5 exhibited an increasing trend in the resistance increase rate as the surplus electrolyte amount/intra-electrode body electrolyte amount ratio (A/B) increased. With the batteries under test, the resistance increase rate increased significantly when the surplus electrolyte amount/intra-electrode body electrolyte amount ratio (A/B) exceeded 0.2. These results show that the surplus electrolyte amount/intra-electrode body electrolyte amount ratio (A/B) is appropriately set so as to equal or fall below 0.2 and particularly favorably set so as to equal or fall below 0.19.

In addition, as shown in FIGS. 6 and 7, when values of the surplus electrolyte amount/intra-electrode body electrolyte amount ratio (A/B) were the same, the batteries according to Examples 2 to 4 with DBP absorption set so as to range from 30 to 45 (ml/100 g) had a lower resistance increase rate after high-rate cycles as compared to the batteries according to Examples 1 and 5. In other words, it was confirmed that an increase in resistance associated with an increase in the surplus electrolyte amount is suppressed by setting the DBP absorption so as to range from 30 to 45 (ml/100 g). These results show that DBP absorption is appropriately set so as to range from 30 (ml/100 g) to 50 (ml/100 g) and particularly favorably set so as to range from 30 (ml/100 g) to 45 (ml/100 g).

Moreover, as described above, with a battery having a surplus electrolyte amount, favorable low-temperature high-rate cycle characteristics can be effectively produced by setting the DBP absorption of the positive electrode active material so as to equal or exceed 30 (ml/100 g). However, with a positive electrode active material made up of solid particles, there is a limit in increasing the DBP absorption of the positive electrode active material. Therefore, in order to set the DBP absorption of the positive electrode active material layer to 30 (ml/100 g), it is important to select a suitable positive electrode active material.

Therefore, the present inventors considered selecting a positive electrode active material which itself has holes and which improves the DBP absorption of the positive electrode active material layer.

Figure 8:
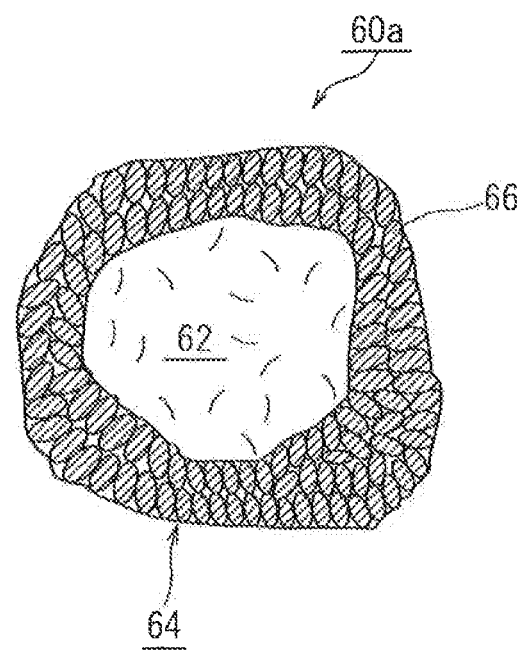
FIG. 8 is a diagram schematically showing a configuration of a positive electrode active material according to an embodiment of the present invention.

For example, as shown in FIG. 8, the positive electrode active material may be formed of a secondary particle 64 resulting from an aggregation of a plurality of primary particles 66 of a lithium transition metal oxide. In this case, for example, a positive electrode active material 60a may be used in which a hollow portion 62 is formed in the secondary particle 64. In the mode shown in FIG. 8, a large number of micropores too minute to be illustratable are desirably formed between primary particles 66 in the secondary particle 64 to realize a configuration which enables a non-aqueous electrolyte to penetrate into the hollow portion 62. Accordingly, the DBP absorption of the positive electrode active material 60a can be readily adjusted so as to equal or exceed 30 (ml/100 g). Hereinafter, a structure of the positive electrode active material 60a having such a hollow portion 62 will be referred to as a "hollow structure" when appropriate.

Figure 9:
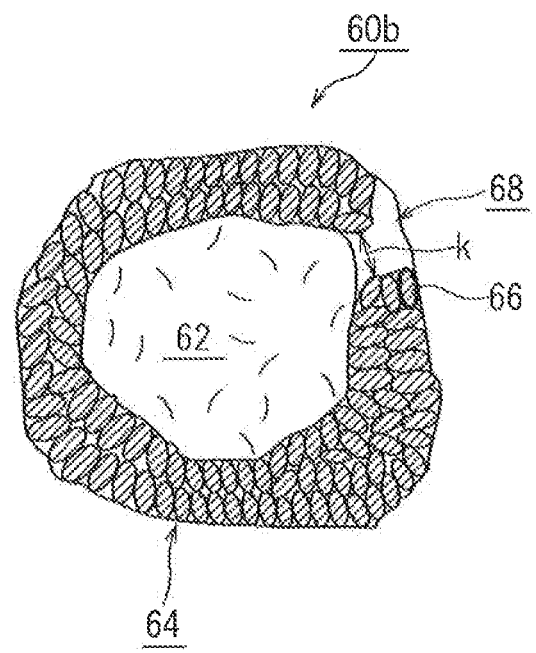
FIG. 9 is a diagram schematically showing a configuration of a positive electrode active material according to an embodiment of the present invention.

In addition, as another mode, for example, a positive electrode active material 60b may further have a through hole 68 that penetrates the secondary particle 64 so as to connect the hollow portion 62 to the outside as shown in FIG. 9. Hereinafter, a structure of the positive electrode active material 60b having such through hole 68 will be referred to as a "holed hollow structure" when appropriate. With the positive electrode active material 60b, an electrolyte is able to migrate more easily between the hollow portion 62 and the outside through the through hole 68 and the electrolyte in the hollow portion 62 is appropriately replaced. Therefore, an electrolyte depletion that is a shortage of the electrolyte is less likely to occur inside the hollow portion 62. As a result, the primary particles 66 of the positive electrode active material 60b are more actively utilized inside the hollow portion 62. Accordingly, the DBP absorption of the positive electrode active material 60b can be adjusted so as to equal or exceed 30 (ml/100 g) and battery performance can be further improved.

In this case, an average opening width k of the through holes 68 is favorably equal to or greater than 0.01 µm. Accordingly, the electrolyte can more reliably penetrate into the hollow portion 62 and the effects described above can be more readily obtained. In addition, the average opening width k of the through holes 68 is favorably equal to or less than 2.0 µm. Here, the opening width k of the through hole 68 refers to the length extending across a narrowest portion of the through hole 68 (an inner diameter of the through hole 68) among a path extending to the hollow portion 62 from the outside of the active material particle through the secondary particle. Moreover, when there are a plurality of through holes 68 in the hollow portion 62, an evaluation may be performed with the through hole 68 having the greatest opening width k among the plurality of through holes 68. In addition, the average opening width k of the through holes 68 may be equal to or less than 2.0 µm, more favorably equal to or less than 1.0 µm, and further favorably equal to or less than 0.5 µm.

In addition, the average number of through holes 68 per one particle of the positive electrode active material 60b may range from around 1 to 20 and more favorably range from around 1 to 5. According to the positive electrode active material 60b structured as described above, preferable battery performance can be produced in a more stable manner. Moreover, the number of through holes 68 in the positive electrode active material 60b with the holed hollow structure may be obtained by, for example, ascertaining the number of through holes per particle for at least 10 or more arbitrarily selected active material particles and then determining an arithmetic average thereof. A method of manufacturing the positive electrode active material 60b with the holed hollow structure may include, for example, a raw material hydroxide formation step, a mixing step, and a firing step.

In this case, the raw material hydroxide formation step is a step of supplying ammonium ions to an aqueous solution of a transition metal compound and precipitating particles of the transition metal hydroxide from the aqueous solution. The aqueous solution favorably contains at least one transition metal element that constitutes the lithium transition metal oxide. In addition, the raw material hydroxide formation step favorably includes a nucleation stage in which a transition metal hydroxide is precipitated from the aqueous solution at a pH 12 or higher and at an ammonium ion concentration equal to or lower than 25 g/L and a particle growth stage in which the precipitated transition metal hydroxide is grown at a pH lower than 12 and at an ammonium ion concentration equal to or higher than 3 g/L.

Furthermore, the mixing step is a step of mixing particles of the transition metal hydroxide obtained in the raw material hydroxide formation step with a lithium compound to prepare an unfired mixture. Moreover, the firing step is a step of firing the mixture obtained in the mixing step to obtain active material particles. According to this production method, the positive electrode active material 60b having a holed hollow structure can be suitably produced.

In addition, in this case, the firing step may be carried out such that a maximum firing temperature ranges from 800° C. to 1100° C. As a result, since the primary particles can be adequately sintered, active material particles having a desired average hardness can be preferably produced. This firing step is preferably carried out so that, for example, the secondary particle is formed in which gaps are not present at grain boundaries of the primary particles at portions other than the hollow portion 62 and the through hole 68.

Furthermore, the firing step may include a first firing stage in which the mixture is fired at a temperature T1 ranging from 700° C. to 900° C. and a second firing stage in which the result of the first firing stage is fired at a temperature T2 ranging from 800° C. to 1100° C. that is higher than the firing temperature T1 of the first firing stage.

In a preferable aspect of the active material particle production method disclosed herein, the firing step includes a first firing stage, in which the mixture is fired at a temperature T1 ranging from 700° C. to 900° C., and a second firing stage, in which the result of the first firing stage is fired at a temperature T2 ranging from 800° C. to 1100° C. that is higher than the firing temperature T1 of the first firing stage. As a result of firing the mixture in an aspect that includes these first and second firing stages, preferable active material particles having a holed hollow structure disclosed herein can be suitably produced. In addition, for example, by suitably elaborating the firing step, the positive electrode active material 60a with a "hollow structure" such as that shown in FIG. 8 can be obtained by a similar method.

Furthermore, BET specific surface areas of the positive electrode active materials 60a and 60b favorably ranges from 0.5 to 1.9 $m^2/g$. A positive electrode active material satisfying the requirement regarding BET specific surface area described above can be used in a positive electrode of a lithium secondary battery and is capable of yielding a battery that stably produces higher performance. For example, a lithium secondary battery can be constructed that has low internal resistance (or in other words, favorable output characteristics) and demonstrates little increase in resistance attributable to charge-discharge cycles (particularly, charge-discharge cycles that include high-rate discharge).

The positive electrode active material 60a with the "hollow structure" and the positive electrode active material 60b with the "holed hollow structure" described above may be adopted as preferable modes of a positive electrode active material having a BET specific surface area ranging from 0.5 to 1.9 $m^2/g$.

In addition, the positive electrode active material 60a with the "hollow structure" and the positive electrode active material 60b with the "holed hollow structure" may have higher degrees of hardness than secondary particles obtained by granulating primary particles using a spray-drying method (porous secondary particles having minute holes inside). For example, an average hardness may equal or exceed 0.5 MPa as obtained by dynamic hardness measurement under conditions of a loading speed ranging from 0.5 mN/sec to 3 mN/sec using a flat diamond indenter having a diameter of 50 μm.

In another preferable aspect of the active material particles disclosed herein, the average hardness of the positive electrode active material 60a having the hollow structure and the positive electrode active material 60b having the holed hollow structure is approximately equal to or greater than 0.5 MPa. Here, average hardness refers to a value obtained by measuring dynamic hardness under conditions of a loading speed ranging from 0.5 mN/sec to 3 mN/sec using a flat diamond indenter having a diameter of 50 μm. In this manner, active material particles having a hollow structure and high average hardness (or in other words, high shape retention) as shown in FIGS. 8 and 9 are able to yield a battery that stably demonstrates higher performance. Therefore, for example, a contribution may be made to constructing a lithium secondary battery that exhibits a small increase in resistance even when charge-discharge cycles (in particular, charge-discharge cycles including low-temperature, high-rate charge and discharge) are performed.

In addition, the positive electrode active material 60a having the hollow structure and the positive electrode active material 60b having the holed hollow structure may be a lithium transition metal oxide which has a layered structure and which contains nickel as a structural element. Furthermore, the positive electrode active material 60a having the hollow structure and the positive electrode active material 60b having the holed hollow structure may be a lithium transition metal wide which has a layered structure and which contains nickel, cobalt, and manganese as structural elements.

Furthermore, for example, the positive electrode active material 60a having the hollow structure and the positive electrode active material 60b having the holed hollow structure favorably have an average particle diameter ranging from approximately 3 μm to 10 μm. In addition, an average opening size of the through holes 68 of the positive electrode active material 60b having the holed hollow structure is favorably equal to or less than ½ of the average particle diameter of the positive electrode active material 60b. Since the average opening size lies within a suitable range, the positive electrode active material 60b is able to readily secure a desired average hardness while suitably demonstrating effects of improving battery performance as a result of having the holed hollow structure. Thus, favorable battery performance can be demonstrated in a more stable manner.

In addition, with the positive electrode active material 60a having the hollow structure and the positive electrode active material 60b having the holed hollow structure, since the hollow portion 62 is formed in the secondary particle 64, the DBP absorption of the positive electrode active material can be adjusted so as to range from 30 to 50 (ml/100 g). Therefore, favorable low-temperature high-rate cycle characteristics can be produced with a battery having an increased surplus electrolyte amount/intra-electrode body electrolyte amount ratio (A/B).

Although an example of an appropriate positive electrode active material has been presented above as a positive electrode active material contained in the positive electrode active material layer 14 of a lithium secondary battery, a positive electrode active material of a lithium secondary battery according to the present invention is not limited to the example described above.

While the present invention has been described in its preferred embodiment, it is to be understood that the present invention is not limited to such descriptions and that various modifications can obviously be made.

Figure 10:
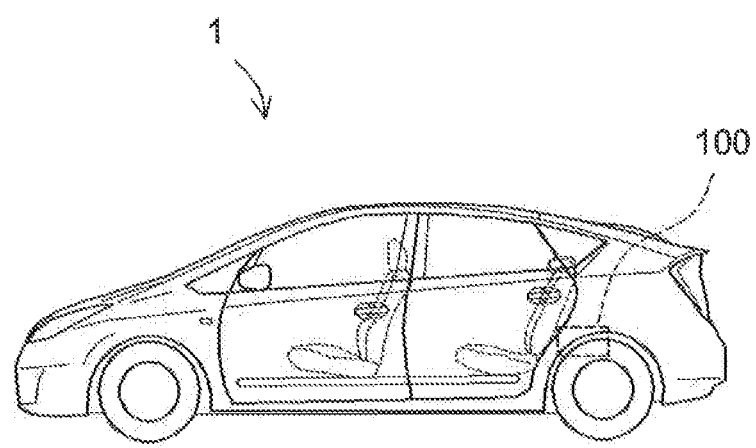
FIG. 10 is a side view schematically showing a vehicle (automobile) comprising an assembled battery according to an embodiment of the present invention.

With any of the nonaqueous electrolyte secondary batteries disclosed herein, since capacity degradation due to high-temperature charge-discharge cycles is minimal and an increase in resistance associated with low-temperature high-rate charge-discharge cycles is favorably suppressed, performance that is suitable as a vehicle-mounted nonaqueous electrolyte secondary battery can be provided. Therefore, the present invention provides, as shown in FIG. 10, a vehicle 1 comprising the nonaqueous electrolyte secondary battery 100 disclosed herein. In particular, a vehicle (for example, an automobile) comprising the battery as a power supply (typically, a power supply of a hybrid vehicle or an electric vehicle) is provided.

In addition, examples of favorable application objects of the technique disclosed herein include: a nonaqueous electrolyte secondary battery envisioned to be possibly used in charge-discharge cycles which include high-rate charges and discharges at 50 A or higher (for example, 50 A to 250 A) and further at 100 A or higher (for example, 100 A to 200 A); and a large-capacity nonaqueous electrolyte secondary battery which has a theoretical capacity of 1 Ah or greater (further, 3 Ah or greater) and which is envisioned to be used in charge-discharge cycles which include high-rate charges and discharges at 10 C or higher (for example, 10 C to 50 C) and further at 20 C or higher (for example, 20 C to 40 C).

INDUSTRIAL APPLICABILITY

The configuration of the present invention can provide a nonaqueous electrolyte secondary battery with superior high-temperature charge-discharge cycle characteristics as well as superior low-temperature high-rate charge-discharge cycle characteristics.

The invention claimed is:

1. A nonaqueous electrolyte secondary battery comprising:
   an electrode body which includes a positive electrode and a negative electrode; and
   a battery case which houses the electrode body together with a nonaqueous electrolyte, wherein
   among the nonaqueous electrolyte housed in the battery case, an electrolyte amount ratio (A/B) between a surplus electrolyte amount (A) that exists outside the electrode body and an intra-electrode body electrolyte amount (B) impregnating the electrode body ranges from 0.05 to 0.2,
   dibutylphthalate (DBP) absorption of a positive electrode active material that constitutes the positive electrode is 30 to 50 mL/100 g, and
   the positive electrode active material includes a secondary particle formed of
      a shell portion comprising an aggregation of a plurality of primary particles of a lithium transition metal oxide,
      a hollow portion formed in the secondary particle separate from the shell portion, and
      a through hole that penetrates the shell portion of the secondary particle so as to connect the hollow portion to the outside.

2. The nonaqueous electrolyte secondary battery according to claim 1, wherein the DBP absorption of the positive electrode active material is equal to or greater than 30 mL/100 g and is equal to or lower than 45 mL/100 g.

3. The nonaqueous electrolyte secondary battery according to claim 1, wherein the electrolyte amount ratio (A/B) ranges from 0.068 to 0.19.

4. The nonaqueous electrolyte secondary battery according to claim 1, wherein the nonaqueous electrolyte is prepared by dissolving 0.7 to 1.6 mol/L of a supporting electrolyte selected from among $LiPF_6$, $LiBF_4$, $LiClO_4$, and $LiAsF_6$ in a mixed solvent constituted by a cyclic carbonate and a chain carbonate.

5. The nonaqueous electrolyte secondary battery according to claim 1, wherein the positive electrode active material has an average hardness equal to or greater than 0.5 MPa as obtained by dynamic hardness measurement under conditions of a loading speed ranging from 0.5 mN/sec to 3 mN/sec using a flat diamond indenter having a diameter of 50 μm.

6. The nonaqueous electrolyte secondary battery according to claim 1, wherein the through hole has an average opening width equal to or less than ½ of the average particle diameter of the positive electrode active material.

7. The nonaqueous electrolyte secondary battery according to claim 1, wherein the through hole has an average opening width 0.01 to 2.0 μm.

8. The nonaqueous electrolyte secondary battery according to claim 1, wherein the positive electrode active material is a lithium transition metal oxide which has a layered structure and which contains nickel as a structural element thereof.

9. The nonaqueous electrolyte secondary battery according to claim 1, wherein the positive electrode active material is a lithium transition metal oxide which has a layered structure and which contains nickel, cobalt, and manganese as structural elements thereof.

10. The nonaqueous electrolyte secondary battery according to claim 1, wherein
    the positive electrode is a sheet-shaped positive electrode constructed by adding a positive electrode active material layer onto a sheet-shaped positive electrode current collector,
    the negative electrode is a sheet-shaped negative electrode constructed by adding a negative electrode active material layer onto a sheet-shaped negative electrode current collector, and
    the electrode body is a wound electrode body constructed by winding the sheet-shaped positive electrode and the sheet-shaped negative electrode with a separator therebetween.

11. A vehicle comprising the nonaqueous electrolyte secondary battery according to claim 1 as a power supply.

* * * * *